United States Patent
Matsuyama et al.

(10) Patent No.: US 8,859,142 B2
(45) Date of Patent: Oct. 14, 2014

(54) NON-AQUEOUS ELECTROLYTE SECONDARY BATTERY

(75) Inventors: Takahiro Matsuyama, Osaka (JP); Satoshi Okano, Osaka (JP); Naoto Nishimura, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 336 days.

(21) Appl. No.: 13/319,569

(22) PCT Filed: May 11, 2010

(86) PCT No.: PCT/JP2010/057955
§ 371 (c)(1),
(2), (4) Date: Jan. 27, 2012

(87) PCT Pub. No.: WO2010/131650
PCT Pub. Date: Nov. 18, 2010

(65) Prior Publication Data
US 2012/0129047 A1    May 24, 2012

(30) Foreign Application Priority Data

May 13, 2009  (JP) .................... 2009-116680
Jun. 3, 2009   (JP) .................... 2009-134154

(51) Int. Cl.
*H01M 4/66*     (2006.01)
*H01M 10/052*   (2010.01)
*H01M 10/0525*  (2010.01)
*H01M 2/16*     (2006.01)

(52) U.S. Cl.
CPC ............ *H01M 10/052* (2013.01); *Y02E 60/122* (2013.01); *H01M 4/661* (2013.01); *H01M 10/0525* (2013.01); *H01M 4/668* (2013.01); *H01M 2/16* (2013.01)
USPC ............................. 429/211; 429/253; 429/254

(58) Field of Classification Search
USPC .......................................... 429/211, 253, 254
See application file for complete search history.

(56) References Cited

U.S. PATENT DOCUMENTS

| | | | |
|---|---|---|---|
| 5,434,024 A | | 7/1995 | Ikeda et al. |
| 6,432,576 B1 * | | 8/2002 | Hikmet .................... 429/162 |
| 2007/0184350 A1 * | | 8/2007 | Kim et al. ................. 429/247 |
| 2008/0241672 A1 | | 10/2008 | Utsumi et al. |

FOREIGN PATENT DOCUMENTS

| | | |
|---|---|---|
| JP | 6-196170 | 7/1994 |
| JP | 6-349481 | 12/1994 |
| JP | 11-102711 | 4/1999 |
| JP | 11102711 A * | 4/1999 |

(Continued)

OTHER PUBLICATIONS

English translation of JP 11102711 A, Kosaka, Japan, Apr. 1999.*

(Continued)

*Primary Examiner* — Mark F Huff
*Assistant Examiner* — Rashid Alam
(74) *Attorney, Agent, or Firm* — Nixon & Vanderhye, P.C.

(57) ABSTRACT

A non-aqueous electrolyte secondary battery comprising electrodes including a positive electrode and a negative electrode, a separator positioned between the electrodes, and a non-aqueous electrolyte, wherein the electrodes have a collector carrying an active substance material, and the collector of at least one of the positive electrode and the negative electrode is a three-dimensional structure formed of a resin fiber covered with a metal film.

17 Claims, 3 Drawing Sheets

(56) References Cited

FOREIGN PATENT DOCUMENTS

| JP | 2006-286365 | 10/2006 |
| JP | 2008-10316 | 1/2008 |
| JP | 2008-21556 | 1/2008 |
| JP | 2008-159497 | 7/2008 |
| JP | 2008-181739 | 8/2008 |
| JP | 2008-251226 | 10/2008 |
| JP | 2010-009905 | 1/2010 |

OTHER PUBLICATIONS

International Search Report for PCT/JP2010/057955 mailed Aug. 10, 2010.

* cited by examiner

NON-AQUEOUS ELECTROLYTE SECONDARY BATTERY

This application is the U.S. national phase of International Application No. PCT/JP2010/057955 filed 11 May 2010 which designated the U.S. and claims priority to JP 2009-116680 filed 13 May 2009 and JP 2009-134154 filed 3 Jun. 2009, the entire contents of each of which are hereby incorporated by reference.

TECHNICAL FIELD

The present invention relates to a non-aqueous electrolyte secondary battery. More specifically, the present invention relates to a non-aqueous electrolyte secondary battery capable of realizing a large capacity, a low cost and high safety.

BACKGROUND ART

An non-aqueous electrolyte secondary battery (hereinafter, also referred to as secondary battery) including representatively a lithium ion secondary battery is widely used in consumer devices because of their high capacity, high energy density and excellent storage performance and charge and discharge repeating characteristics. On the other hand, an adequate safety measure is required because a secondary battery uses lithium metal and a non-aqueous electrolyte.

For example, when a short circuit occurs between a positive electrode and a negative electrode due to some reason in a secondary battery having a large capacity and high energy density, an excess short circuit current flows. Since the short circuit current makes an internal resistance to generate Joule heat, the temperature of the secondary battery also rises. The secondary battery with increased temperature can go into an abnormal condition. For this reason, the secondary battery using a non-aqueous electrolyte including the lithium ion secondary battery is provided with a function of preventing themselves from going into an abnormal condition.

Among a number of proposals for a function of preventing an abnormal condition that have been made heretofore, there is a proposal described in Japanese Unexamined Patent Publication No. HEI 11 (1999)-102711 (Patent Document 1). This proposal reports a lithium ion secondary battery wherein for a collector composed of a resin film having a low melting point (130° C. to 170° C.) and metal layers formed on both faces of the same, a positive electrode and a negative electrode formed with active material layers of a positive electrode and a negative electrode are used.

In the secondary battery having the collector containing a resin film, when abnormal heat generation occurs due to a short circuit, caused by contamination of foreign matters between the positive electrode and the negative electrode, for example, the resin film having a low melting point fuses and the metal layer formed on the top thereof is also broken. Due to such fusion and breakage, the current between the positive electrode and the negative electrode is cut. It is believed that as a result of this, the temperature rise inside the secondary battery is suppressed and ignition is prevented.

PRIOR ART DOCUMENTS

Patent Documents

Patent Document 1: Japanese Unexamined Patent Publication No. HEI 11 (1999)-102711

SUMMARY OF THE INVENTION

Problems to be Solved by the Invention

The collector used in the secondary battery of the above publication is planar. Therefore, when heat generation occurs due to a short circuit, the response leading to fusion of the resin film and breakage of the metal film may be poor. In addition, when the thickness of the electrode (positive electrode and/or negative electrode) is large, the rate characteristic decreases, and a sufficient charge and discharge characteristics may not be achieved.

Solutions to the Problems

According to the present invention, there is provided a non-aqueous electrolyte secondary battery comprising electrodes including a positive electrode and a negative electrode, a separator positioned between the electrodes, and a non-aqueous electrolyte, wherein the electrodes have a collector carrying an active substance material, and the collector of at least one of the positive electrode and the negative electrode is a three-dimensional structure formed of a resin fiber covered with a metal film.

Effects of the Invention

According to the present invention, by providing at least one of a positive electrode and a negative electrode with a collector having a three-dimensional structure formed of a resin fiber covered with a metal film, it is possible to shorten a physical distance between a short circuit point (abnormal part) and a current interruption part when abnormal heat generation occurs in the secondary battery. As a result, the response leading to increase in resistance at the short circuit point is improved to enhance the safety, and a secondary battery having a large capacity can be provided at a low cost.

Further, since a nonwoven fabric formed of the resin fiber covered with the metal film forms the three-dimensional structure, it is possible to provide a secondary battery with further increased safety.

Further, since a polyolefin resin fiber having an endothermic peak within a specific temperature range is used as the resin fiber, it is possible to provide a secondary battery with further increased safety.

Further, since the polyolefin resin fiber includes a polyethylene resin fiber or a polypropylene resin fiber, it is possible to provide a secondary battery with further increased safety.

Furthermore, since the collector has a porosity within a specific range, it is possible to improve the retentivity of the active substance material, and to provide a secondary battery with increased safety.

Further, since the metal film is a film of metal selected from nickel, aluminum, titanium and gold, it is possible to provide a secondary battery with improved current collectability.

Furthermore, since the metal film covers the resin fiber in an amount of 50 to 300 g/m$^2$, it is possible to provide a secondary battery with further improved current collectability.

Further, it is possible to provide a secondary battery having a large capacity of 4 Ah or more.

Further, it is possible to provide a secondary battery having a high capacity density of 90 Ah/m$^2$ or more per area of the positive electrode or the negative electrode.

Further, since the collector carrying the active substance material has a resistivity of 10 Ω·cm or less, it is possible to provide a secondary battery with improved current collectability.

Further, by using a positive electrode or a negative electrode having a high capacity density of 90 Ah/m² or more per area of the positive electrode or the negative electrode, it is possible to reduce the number of electrodes and the number of separators per battery capacity, and to provide a secondary battery at a low cost.

Further, since the collector of the positive electrode has a three-dimensional structure formed of a resin fiber covered with a metal film, and the metal film has an underlaying metal layer covering the resin fiber and an upper metal layer covering the underlaying metal layer, it is possible to suppress elution of metal into a non-aqueous electrolyte even when metal that elutes into the underlaying metal layer at a low potential is used. Therefore, the metal capable of elevating an upper limit voltage at the time of charging can be used in the underlaying metal layer, and as a result, the capacity of the secondary battery can be further increased.

Further, since the underlaying metal layer is a layer of metal selected from nickel, copper, palladium, tin and alloys of these metals, it is possible to further improve the adherence between the upper metal layer and the resin fiber, and to provide a secondary battery with further improved safety.

Further, since the upper metal layer is a layer of metal selected from aluminum, titanium, gold and platinum, it is possible to provide a secondary battery of high potential with improved current collectability.

Furthermore, since the collector of the positive electrode contains specific amounts of the underlaying metal layer and the upper metal layer, it is possible to provide a secondary battery with improved safety.

Further, since the underlaying metal layer and the upper metal layer are used at a specific weight ratio, it is possible to provide a secondary battery with improved current collectability.

Furthermore, according to the present invention, it is possible to provide a secondary battery having a potential of vsLi/Li$^+$ of 3.3 to 4.5 V.

MODE FOR CARRYING OUT THE INVENTION

In the following, the present invention will be described by referring to FIGS. 1 to 5. In the following drawings, an identical or a corresponding part is denoted by the same reference numeral, and description thereof will not be repeated. In FIGS. 1 to 5, length, size, width and the like and relations thereof are appropriately changed for the purpose of clarification and simplification of the drawings, and do not represent actual dimensions.

Figure 1:
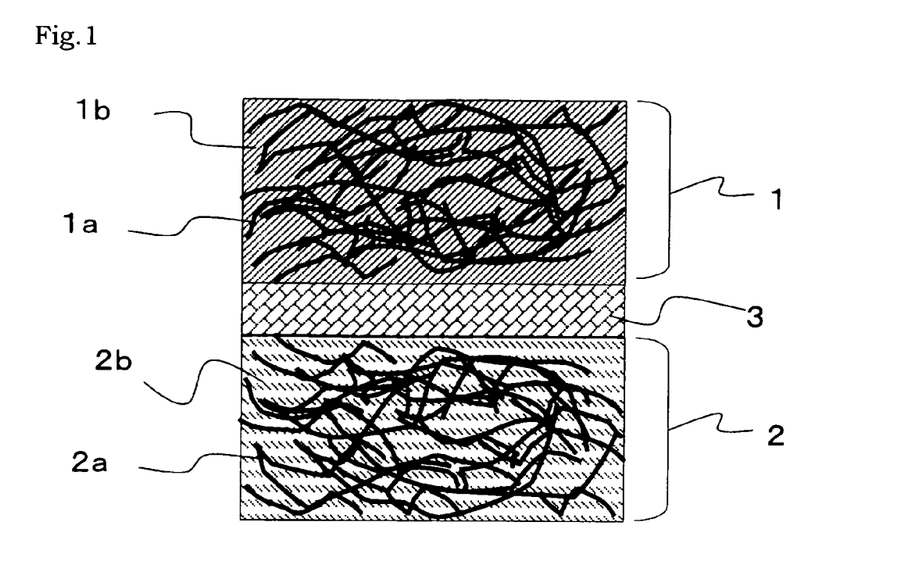
FIG. 1 is a schematic section view showing one embodiment of the secondary battery of the present invention.

FIG. 1 is a schematic section view showing one embodiment of a non-aqueous electrolyte secondary battery of the present invention. The secondary battery includes a positive electrode, a negative electrode, a separator and a non-aqueous electrolyte (not shown). The separator plays a role of ensuring electrical insulation between the positive electrode and the negative electrode, and retaining the non-aqueous electrolyte to ensure ion conduction between the positive electrode and the negative electrode. Further, the positive electrode and the negative electrode have a collector capable of carrying an active substance material. In FIG. 1, 1 means a positive electrode, 1a means a collector, 1b means a positive electrode active substance material, 2 means a negative electrode, 2a means a collector, 2b means a negative electrode active substance material, and 3 means a separator.

Here, a collector of either one of the positive electrode and the negative electrode has a three-dimensional structure including a plurality of resin fibers covered with a metal film. From the view point of increasing the retention amount of the active substance material, it is preferred that the three-dimensional structure forms both of the collectors of the positive electrode and the negative electrode. FIG. 1 shows the case where both of the collectors of the positive electrode and the negative electrode are implemented by a three-dimensional structure having a plurality of resin fibers covered with a metal film. Here, when either one of the positive electrode and the negative electrode is a three-dimensional structure, the other may be a collector formed of a metal foil or a metal plate known in the art.

Figure 2:
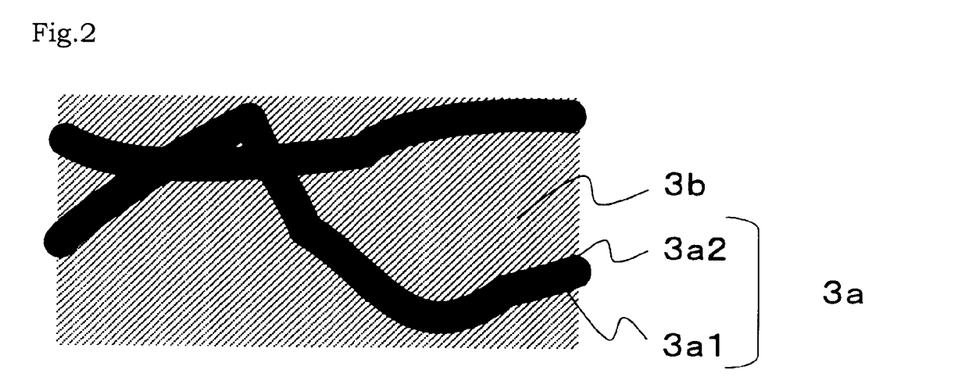
FIG. 2 is a schematic section view showing the collector region in one embodiment of the present invention.

Here, the three-dimensional structure represents the one having a three-dimensional structure rather than a film which is a two-dimensional structure. Therefore, the three-dimensional structure formed of a resin fiber covered with a metal film does not mean a resin film which is a two-dimensional structure covered on both surfaces with a metal film. The three-dimensional structure may be the one having a three-dimensional structure by assembly of a plurality of resin fibers covered with a metal film as shown in FIG. 2. A preferred three-dimensional structure can be defined by appropriately adjusting the porosity of the collector, the amount of resin fiber, thickness, a fiber diameter of an individual resin fiber and so on. In FIG. 2, 3a means a collector, 3a1 means a resin fiber, 3a2 means a metal film, and 3b means an active substance material.

Preferably, the collector of the positive electrode has a three-dimensional structure formed of a resin fiber covered with a metal film, and the metal film has an underlaying metal layer that covers the resin fiber, and an upper metal layer that covers the underlaying metal layer. The collector having this configuration may be used as a collector on the side of the negative electrode.

Figure 3:
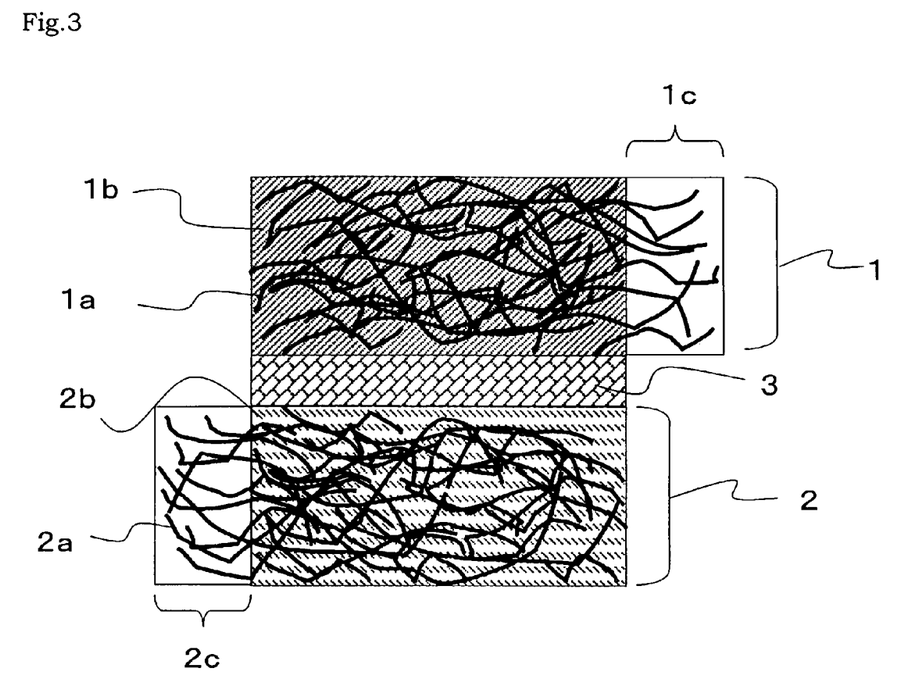
FIG. 3 is a schematic section view showing one embodiment of the secondary battery of the present invention
Figure 4:
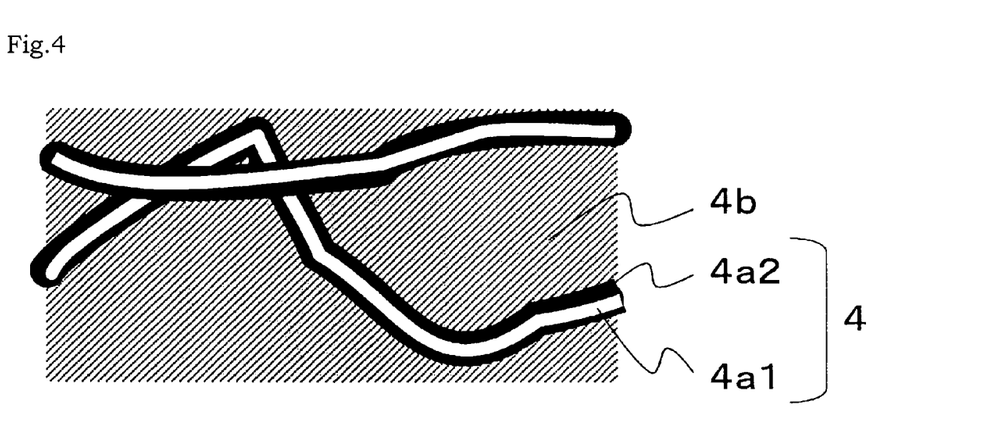
FIG. 4 is a schematic section view showing the collector region in the secondary battery of FIG. 3.
Figure 5:
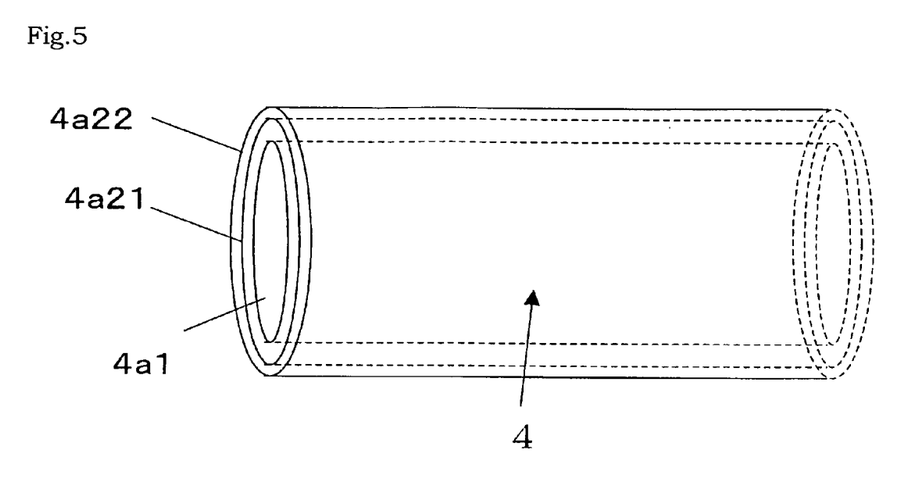
FIG. 5 is a schematic perspective view of an individual resin fiber in the secondary battery of FIG. 3.

Here, the case where the positive electrode and the negative electrode have a collector formed of a resin fiber covered with a laminate of an underlaying metal layer and an upper metal layer thereon is illustrated in FIGS. 3 to 5.

FIG. 3 is a schematic section view showing one embodiment of a non-aqueous electrolyte secondary battery in the above case. In FIG. 3, 1c means a uncoated region on positive electrode, 2c means a uncoated region on negative electrode, and 3 means a separator.

FIG. 4 is a schematic section view of the collector of FIG. 3. In FIG. 4, 4a means a collector, 4a1 means a resin fiber, 4a2 means a metal film (including an underlaying metal layer and an upper metal layer), and 4b means an active substance material. FIG. 5 is a schematic perspective view of a resin fiber covered with a metal film. In FIG. 5, 4a21 means an underlaying metal layer, and 4a22 means an upper metal layer. Preferably, from the view point of increasing the retention amount of the active substance material, a plurality of resin fibers covered with the laminate made up of the underlaying metal layer 4a21 and the upper metal layer 4a22 thereon form both of the collectors of the positive electrode and the negative electrode. FIG. 3 shows the case where both of the collectors of the positive electrode and negative electrode are formed of a plurality of resin fibers covered with a laminate made up of the underlaying metal layer and the upper metal layer thereon.

In the following, constituents of a non-aqueous electrolyte secondary battery of the present invention will be described. The constituents recited in the following description are illustrative only, and are not limited by the following exemplification, and any constituent known in a secondary battery can be used.

Secondary Battery

The present invention may be applied to any types of secondary batteries. As the secondary battery, for example, a lithium ion secondary battery, a metal lithium secondary battery, a lithium polymer secondary battery, a stationary large-size lithium ion secondary battery and so on are recited. Among these, it is preferred to apply the present invention to a lithium ion secondary battery for which further improvement in safety in the case of occurrence of a short circuit current is required.

Collector

For a collector, a material having electric conductivity is used for collecting a current from an ion that is exchanged between the positive electrode and the negative electrode in association with charge and discharge of the secondary battery.

The three-dimensional structure formed of a plurality of resin fibers covered with a metal film that constitutes a collector of at least one of the positive electrode and the negative electrode may be obtained by metal plating or metal vapor deposition on the resin fiber. The collector which is a three-dimensional structure made up of a plurality of resin fibers may be in any forms including a woven fabric form, a non-woven fabric form and a knitted fabric form. Among these, a non-woven fabric form is preferred from the view points of mechanical strength, high chemical resistance, and a low cost in industrial use.

In a secondary battery, thermal runway is more likely to occur at a temperature of 200° C. or higher. Therefore, the resin fiber is desired to have such a characteristic that the current collecting function is broken before the secondary battery reaches 200° C. or higher. And hence, a resin fiber having a thermal deformation temperature of 200° C. or less is desired. In particular, a resin fiber having at least one endothermic peak between 120 and 180° C. is desired. By having an endothermic peak within this range, the current collecting function can be broken at a temperature of 200° C. or less. Further, the endothermic peak at a temperature ranging from 125 to 170° C. is preferred for further contribution to breakage of the current collecting function. Particularly preferably, the endothermic peak is at a temperature ranging from 125 to 165° C. The endothermic peak may be determined by sealing a sample of 3 to 10 mg in weight in an aluminum pan, and measuring at a temperature rise speed of 10° C./min. using a differential scanning calorimeter DSC8230 available from Rigaku Corporation.

From the view points of ensuring carrying performance of the active substance material and ensuring the strength as the collector, the amount of the resin fiber per area of the collector is preferably in the range of 50 to 300 $g/m^2$, and more preferably in the range of 70 to 150 $g/m^2$.

Thickness of the collector is preferably in the range of 0.05 to 10 mm. When the thickness is smaller than 0.05 mm, the carrying performance of the active substance material and the strength as the collector may not be sufficiently ensured. When the thickness is larger than 10 mm, the volume percentage of the collector in the secondary battery is large, so that the battery capacity may not be made large. The thickness is more preferably in the range of 0.08 to 3 mm, and particularly preferably in the range of 0.08 to 1 mm.

From the view point of ensuring the strength as the collector, the collector preferably has a tensile strength of 2 to 500 N/5 cm, and more preferably has a tensile strength of 20 to 350 N/5 cm. The tensile strength may be measured by using a precision universal tester Autograph AGS-J (product of Shimadzu Corporation) under the condition in conformance with JIS-L1906 (2000).

From the view point of ensuring the carrying performance of the active substance material, the collector preferably has a porosity of 50 to 98%, and more preferably has a porosity of 75 to 95%. The porosity may be determined by calculating density of the collector from the thickness of the collector measured by a micrometer and the weight measured by an electronic balance, and determining from a ratio between the true density of the resin fiber and the true density of the covering metal film.

The shape of each resin fiber is not particularly limited insofar as a function as the collector is provided. For example, the cross section shape of the resin fiber may be any of a circle, an ellipse, a triangle, a rectangle, and a monothilic form, and a fiber diameter ranges from 0.5 to 500 μm, and a fiber length is preferably 100 times or more the fiber diameter.

Next, the property that the resin fiber will not be involved by the non-aqueous electrolyte (will not be dissolved or swelled) is desired. Therefore, the resin fiber is preferably a polyolefin resin fiber represented by a polyethylene resin fiber or a polypropylene resin fiber having such a property. Further, a polyethylene component and a polypropylene component that form the polyethylene resin fiber and the polypropylene resin fiber exist in an amount that occupies a main ingredient (for example, an amount larger than 50% by weight) in the resin fiber. The polyethylene resin fiber and the polypropylene resin fiber may contain other components than the polyethylene component and the polypropylene component. As other components, other monomer components capable of copolymerizing with ethylene or propylene, and other resins can be recited. The other resin exists in a form of a mixture together with the polyethylene component and the polypropylene component in the resin fiber.

As other monomers, hydrocarbons having two vinyl groups such as butadiene, aromatic vinyl monomers such as styrene and α-methylstyrene, (meth)acrylic acid ester monomers such as methyl (meth)acrylate, ethyl (meth)acrylate and butyl (meth)acrylate, and vinyl acetate can be recited. Here, (meth)acryl means methacryl or acryl.

As other resins, polyester resins, fluorine resins, polyimide resins, polyamide (nylon) resins, cellulose resins and the like can be recited.

The resin fiber is covered with a metal film. The term "cover" does not mean strictly covering the entire surface of the resin fiber. Therefore, a part of the resin fiber may not be covered with the metal film and be exposed.

A covering amount of the metal film is preferably in an amount of 50 to 300 $g/m^2$ per area of the collector. When the covering amount is less than 50 $g/m^2$, sufficient current collectability may not be ensured. When it is more than 300 $g/m^2$, even when abnormal heat generation occurs in the battery, increase in a resistance at the short circuit point may not occur. A preferred covering amount is an amount of 100 to 250 $g/m^2$.

The kind of the metal film is not particularly limited insofar as sufficient current collectability is ensured. For example, a film of metal selected from nickel, copper, aluminum, titanium and gold can be recited.

From the view point of ensuring sufficient current collectability, the collector preferably has a resistivity of 10 Ω·cm or less in the condition that it carries an active substance. A more preferred resistivity is 1.5 Ω·cm or less.

A known collector other than the collector formed of a resin fiber may be used either in the positive electrode or the negative electrode. As such a known collector, for example, a foil or a thin plate of conductive metal such as SUS, aluminum, nickel and copper can be recited.

Here, when a three-dimensional structure formed of a resin fiber covered with a laminate (metal film) made up of an underlaying metal layer and an upper metal layer thereon is used in the collector of the positive electrode, the collector can be obtained by plating or vapor depositing the metal for formation of the underlaying metal layer and the upper metal layer on the resin fiber. The collector having a three-dimensional structure including a plurality of resin fibers may have any forms including a woven fabric form, a non-woven fabric form and a knitted fabric form. Among these, a non-woven fabric form is preferable from the view points of imparting the mechanical strength and chemical resistance, and reducing the cost in industrial use.

The resin fiber is covered with a metal layer made up of an underlaying metal layer and an upper metal layer. The term "cover" does not mean strictly covering the entire surface of the resin fiber. Therefore, a part of the resin fiber may not be covered with the metal layer and be exposed.

The covering amount of the underlaying metal layer is an amount of 50 to 300 $g/m^2$ per area of the collector. When the covering amount is less than 50 $g/m^2$, sufficient adhesion between the upper metal layer and the resin fiber may not be ensured. When it is larger than 300 $g/m^2$, even when abnormal heat generation occurs in the battery, increase in a resistance at the short circuit point may not occur. A preferred covering amount is an amount of 100 to 250 $g/m^2$.

The covering amount of the upper metal layer is an amount of 5 to 200 $g/m^2$ per area of the collector. When the covering amount is less than 5 $g/m^2$, sufficient covering and current collectability may not be ensured. When it is more than 200 $g/m^2$, even when abnormal heat generation occurs in the battery, increase in a resistance at the short circuit point may not occur. A preferred covering amount is an amount of 10 to 150 $g/m^2$.

Further, the underlaying metal layer is preferably used in an amount of 1 to 50 parts by weight, with respect to 1 part by weight of the upper metal layer. The use amount within this range realizes both the sufficient adhesion between the upper metal layer and the resin fiber, and ensuring of sufficient current collectability with a good balance. A more preferred use amount of the underlaying metal layer is 1.5 to 25 parts by weight, with respect to 1 part by weight of the upper metal layer.

The kind of the underlaying metal layer is not particularly limited insofar as sufficient adhesion between the upper metal layer and the resin fiber is ensured. For example, a film of metal selected from a layer of metal selected from nickel, copper, palladium, tin and alloys of these metals is recited. Among these, a layer composed of nickel is preferred from the view point of adhesion with the resin.

The kind of the upper metal layer is not particularly limited insofar as elution of the underlaying metal layer is prevented, and sufficient current collectability is ensured. For example, a layer of metal selected from aluminum, titanium, gold and platinum is recited.

Positive Electrode

The positive electrode is formed of a collector carrying a positive electrode active substance. The positive electrode may also contain a conductive material, a thickening material and a binding material besides the positive electrode active substance. Such a positive electrode may be fabricated by applying a paste in which the positive electrode active substance, and optionally a conductive material, a thickening material and a binding material are dispersed in a solvent, on the collector, and drying the same.

As the positive electrode active substance, oxide containing lithium is recited. Concrete examples include $LiCoO_2$, $LiNiO_2$, $LiFeO_2$, $LiMnO_2$, $LiMn_2O_4$, and compounds wherein part of the transition metal in these oxides is substituted by other metal element. Among these, the one capable of utilizing 80% or more of the lithium amount possessed by the positive electrode for the battery reaction in a normal use is preferably used as the positive electrode active substance, and this makes it possible to improve the safety of the secondary battery against an accident such as excess charging. As such a positive electrode active substance, compounds having a spinel structure such as $LiMn_2O_4$, and compounds having an olivine structure represented by $LiMPO_4$ (M is at least one kind of element selected from Co, Ni, Mn and Fe) are recited. Among these, a positive electrode active substance containing Mn and/or Fe is preferred from the view point of the cost. Further, from the view points of safety and charge voltage, $LiFePO_4$ is preferred. $LiFePO_4$ is excellent in safety because every oxygen binds to phosphorus by a rigid covalent bond, and release of oxygen due to temperature rise is unlikely to occur. Furthermore, anti-flash action is also expected because phosphorus is contained.

The use amount of the positive electrode active substance is preferably between 500 to 1000 $g/m^2$ per area of the collector. When the use amount is less than 500 $g/m^2$, sufficient battery performance may not be ensured. When the use amount is more than 1000 $g/m^2$, increase in a resistance at the short circuit point may not occur even when abnormal heat generation occurs in the battery. A more preferred use amount is between 600 and 850 $g/m^2$.

As the conductive material, for example, carbon materials such as acetylene black, Ketjen black, and graphite (natural graphite, artificial graphite) are recited.

As the thickening material, for example, polyethyleneglycols, celluloses, polyacrylamides, polyN-vinylamides, polyN-vinylpyrrolidones and the like are recited, and among these, polyethyleneglycols, celluloses such as carboxymethylcellulose (CMC) are preferred, and CMC is particularly preferred.

As the binding material, for example, polyvinylidene fluoride (PVdF), polyvinylpyridine, polytetrafluoroethylene, styrenebutadiene rubber and the like are recited.

A mixing ratio of these binding material, thickening material and conductive material varies depending on the kinds of the binding material, thickening material and conductive material to be mixed, and about 0.1 to 15 parts by weight of the binding material, about 0.1 to 20 parts by weight of the thickening material, and about 0.1 to 50 parts by weight of the conductive material may be used with respect to 100 parts by weight of the positive electrode active substance. When the mixing proportion of the binding material is less than about 0.1 part by weight, the binding ability may be insufficient, whereas when it is more than about 15 parts by weight, the active substance amount contained in the positive electrode is reduced, and resistance of the positive electrode or polarization may increase and the discharge capacity may decrease. When the mixing proportion of the thickening material is less than about 0.1 part by weight, the thickening ability may be insufficient, whereas when it is more than about 20 parts by weight, the active substance amount contained in the positive electrode is reduced, and resistance of the positive electrode or polarization may increase and the discharge capacity may decrease. Further, when the mixing proportion of the conductive material is less than about 0.1 part by weight, resistance of the electrode or polarization may increase and the discharge capacity may decrease, whereas when it is more than about 50 parts by weight, the discharge capacity as the negative electrode may decrease by reduction of the active substance amount contained in the electrode.

As the solvent, for example, water, N-methyl-2-pyrrolidone (NMP), N,N-dimethylformaide (DMF) and the like are recited. The use amount of the solvent is not particularly limited, and is an amount imparting the paste with such a viscosity that is applicable onto the collector.

Negative Electrode

The negative electrode is formed of a collector carrying a negative electrode active substance. The negative electrode may contain a conductive material, a thickening material, and a binding material besides the negative electrode active substance. Such a negative electrode may be fabricated by applying a paste in which a negative electrode active substance, and optionally a conductive material, thickening material and a binding material are dispersed in a solvent, on a collector, and drying the same.

As the negative electrode active substance, a graphitic carbon material may be usually used. As the graphitic carbon material, for example, natural graphite, particulate (for example, scale-like, massive, fibrous, whisker-like, spherical or ground) artificial graphite, or high crystalline graphite represented by graphitized articles such as mesocarbon microbeads, mesophase pitch powder and isotropic pitch powder, and non-graphitizable carbon such as resin burnt carbon and the like are recited. Further, a mixture of these may be used. Also oxide of tin, silicon-based negative electrode active substances, alloy-based negative electrode active substances having a large capacity and the like may be used. Among these, graphitic carbon materials are preferred because flatness of the potential of the charge and discharge reaction is high, and has a potential close to the potential at which metal lithium dissolves and precipitates, and high energy density can be achieved. Further, the graphite powder material having amorphous carbon adhered to the surface is preferred for preventing decomposition of non-aqueous electrolyte in association with charge and discharge, and reducing the gas generation inside the secondary battery.

The graphitic carbon material as the negative electrode active substance is preferably a particulate substance. An average particle size of the particulate substance is preferably 2 to 50 μm, and more preferably 5 to 30 μm. When the average particle size is less than 2 the negative electrode active substance can pass through a pore of the separator, and the negative electrode active substance having passed through can cause a short circuit in the secondary battery. On the other hand, when it is larger than 50 μm, the negative electrode can be difficult to be formed. Further, a specific surface area of the graphitic carbon material is preferably 1 to 100 $m^2/g$, and more preferably 2 to 20 $m^2/g$. When the specific surface area is smaller than 1 $m^2/g$, the site where insertion/elimination reaction of lithium occurs is reduced, and the large current discharging performance of the secondary battery can be deteriorated. On the other hand, when it is larger than 100 $m^2/g$, the site on the surface of the negative electrode active substance where decomposition reaction of the non-aqueous electrolyte occurs is increased, and gas generation or the like may be caused inside the secondary battery. Here, an average particle size and a specific surface area described in the present description are values measured by using an automatic gas/vapor adsorption measurement apparatus BEL-SORP18 available from BEL JAPAN, INC.

The use amount of the negative electrode active substance is preferably between 300 and 600 $g/m^2$ per area of the collector. When the use amount is less than 300 $g/m^2$, sufficient buttery performance may not be ensured. When the use amount is more than 600 $g/m^2$, a resistance at a short circuit point may not increase even when abnormal heat generation occurs in the battery. A more preferred use amount is between 350 and 500 $g/m^2$.

As the conductive material, the thickening material, the binding material and the solvent, any of those exemplified in the section of the positive electrode may be used.

Separator

As the separator, an insulating thin film having large ion permeability and a predetermined mechanical strength may be used. The material forming the separator may be any material that will not be eroded by the electrolyte. Examples include, but are not particularly limited to, polyolefin resins such as polyethylene, polypropylene and poly-4-methylpentene-1, polyester resins such as polyethylene terephthalate, polybutylene terephthalate, polyethylene naphthalate and polytrimethylene terephthalate, polyamide resins such as 6 nylon, 66 nylon and wholly aromatic polyamide, fluorine resins, polyimide resins, cellulose resins, aramid resins, and glass resins. These resins may be used in combination of two or more kinds. As the form of the separator, a non-woven fabric, a woven fabric, a microporous film and the like are recited.

In particular, a non-woven fabric and a microporous film formed of polyethylene, polypropylene, polyester or the like are preferred from the view point of the stability of the quality and the like. With such a non-woven fabric or microporous film of synthetic resin, the secondary battery is imparted with the function (shutdown) that the separator melts due to the heat, and shields between the positive and the negative electrodes when abnormal heat generation occurs in the secondary battery.

Polyimide, polyamide, and aramid resins are excellent in shape stability and are advantageous in that the shape is stable even at an elevated temperature. When the collector of the positive electrode has a lower metal layer and an upper metal layer, polyimide and polyamide are preferred.

Non-Aqueous Electrolyte

As the non-aqueous electrolyte, a solution prepared by dissolving an electrolyte salt in an organic solvent is recited without limitation.

As the electrolyte salt, when it is used in a lithium ion secondary battery, for example, lithium salts formed of lithium as a cation component, and lithium borofluoride, lithium hexafluorophosphate, lithium perchlorate or an organic acid such as fluorine-substituted organic sulfonic acid as an anion component are recited.

As the organic solvent, any solvents that dissolve the aforementioned electrolyte salt can be used. For example, cyclic carbonate esters such as ethylene carbonate, propylene carbonate and butylene carbonate, cyclic esters such as γ-butyrolactone, ethers such as tetrahydrofuran and dimethoxyethane, and chain-like carbonate esters such as dimethyl carbonate, diethyl carbonate and ethylmethyl carbonate are recited. These organic solvents are used singly or in combination of two or more kinds.

Structure of Secondary Battery

The foregoing positive electrode and negative electrode may be stacked plurally with a separator interposed therebetween. For example, a laminate structure repeating negative electrode/separator/positive electrode/separator/negative electrode/separator/positive electrode... is recited. The number of stacking layers may be set depending on the desired battery capacity. In the present invention, it is possible to provide a secondary battery realizing improved safety even with a high capacity of 4 Ah or more. It is also possible to provide a secondary battery with improved safety, having a capacity of 90 Ah/m$^2$ or more per area of the positive electrode or the negative electrode. Further, it is possible to provide a secondary battery (lithium secondary battery) having a potential of vsLi/Li$^+$ of 3.3 to 4.5V.

EXAMPLES

In the following, the present invention will be described more specifically by way of examples, however, it is to be noted that the present invention will not be limited to these examples.

Example 1

As shown in FIG. 1, the secondary battery of Example 1 uses a collector which is a three-dimensional structure formed of a plurality of resin fibers covered with a metal film in both electrodes of the positive electrode and the negative electrode.

As the collector, OX-7617(T-3)282 which is a non-woven fabric available from Japan Vilene Company, Ltd. was used. As shown in FIG. 2, in this collector, the resin fiber 3a1 is a polyolefin resin fiber, and the metal film 3a2 is implemented by a nickel film formed by a plating method. The use amount of the resin fiber 3a1 per area of the collector is 85 g/m$^2$, and the use amount of the metal film 3a2 per area of the collector is 215 g/m$^2$. The collector has a thickness of 1.1 mm, a tensile strength of 260 N/5 cm, a porosity of 92%, a surface resistance of 11 mΩ, a thermal deformation temperature of 120 to 180° C., and an endothermic peak of 130° C.

As the separator, a microporous film (Hipore available from Asahi Chemical Industry Co., Ltd., hereinafter, described as an ordinary article) stretched in the condition that two or more kinds of polyolefin resins of polyethylene and polypropylene are combined was used. The separator has a thickness of 25 μm, and a porosity of about 60%.

As the positive electrode, a positive electrode including LiFePO$_4$ having an olivine structure as an active substance was used (active substance: conductive material: thickening material: binding material=100:6:2:2 (weight ratio)). Concretely, acetylene black (DENKA BLACK (powder) available from DENKI KAGAKU KOGYO KABUSHIKI KAISHA) was used as the conductive material, CMC (WS-C available from DAI-ICHI KOGYO SEIYAKU CO., LTD.) was used as the thickening material, and an aqueous binder (BM-400B available from ZEON CORPORATION) was used as the binding material. By kneading these components using water, a paste for forming a positive electrode was prepared.

As the negative electrode, a negative electrode (active substance: thickening material: binding material=98:1:1(weight ratio)) including artificial graphite (average particle size 13 μm, specific surface area 12 m$^2$/g) as an active substance was used. Concretely, similarly to the positive electrode, CMC was used as the thickening material, and an aqueous binder was used as the binding material. By kneading these components using water, a paste for forming a negative electrode was prepared. As the artificial graphite, SFG 10 available from TIMCAL was used.

As the non-aqueous electrolyte, 1M LiPF$_6$ dissolved in a solvent in which ethylene carbonate (EC) and diethyl carbonate (DEC) were mixed in a volume ratio of 1:2 was used.

Using the above materials, a secondary battery having a capacity of 4 Ah was obtained in the following procedure.

1 (Formation of positive electrode) A collector cut into 8 cm wide and 17 cm long was rubbed with the paste for forming a positive electrode while providing an uncoated region for the region of about 1 cm in an end part of either side. The rubbed paste was pre-dried at 60° C. for 20 minutes and then mainly dried at 100° C. for 20 minutes. The collector including the dried paste was pressed to obtain a positive electrode. A carrying amount of the positive electrode active substance was 820 g/m$^2$ per area of the collector. Resistivity measured by a direct-current four terminal method in the condition that the active substance was carried was 1.1 Ω·cm.

2 (Formation of negative electrode) A collector cut into 9 cm wide and 18 cm long was rubbed with the paste for forming a negative electrode while providing an uncoated region for the region of about 1 cm in an end part of either side. The rubbed paste was pre-dried at 60° C. for 20 minutes and then mainly dried at 100° C. for 20 minutes. The collector including the dried paste was pressed to obtain a negative electrode. A carrying amount of the negative electrode active substance was 380 g/m$^2$ per area of the collector. Resistivity measured by a direct-current four terminal method in the condition that the active substance was carried was 0.9 Ω·cm.

3 (Separator sealing) Two separators respectively cut into 9 cm wide and 18 cm long were prepared. The positive electrode excluding the uncoated region prepared in the above step 1 was sandwiched between these two separators. Then for the two separators, three sides other than the one side of the uncoated region side were heat-sealed to obtain a positive electrode sealed by the separators.

4 (Lamination) The separator-sealed positive electrode fabricated in the above step 3, and the negative electrode fabricated in the above step 2 were stacked in the condition that the uncoated regions of the negative electrode and the positive electrode face each other.

5 (Repeated lamination) For obtaining a predetermined capacity (4 Ah), the above step 4 was repeated, and eventually, four negative electrodes 4, and three positive electrodes that are separator-sealed were stacked.

6 (Attachment of terminal for external output) After lamination, a negative electrode lead for external output made of nickel having a thickness of 0.1 mm (not shown) was attached to the uncoated region of the negative electrode, and a positive electrode lead for external output made of aluminum having a thickness of 0.1 mm (not shown) was attached to the uncoated region of the positive electrode respectively by ultrasonic welding, to obtain a laminate with leads.

7 (Enclosure in can) The above laminate was put into a can formed of iron plated with nickel, and 25 mL of a non-aqueous electrolyte was poured. Then the can was closed with a lid formed of the same material, namely, iron plated with nickel. By welding the outer circumference of the lid by laser, the can was sealed.

By the foregoing steps, the lithium ion secondary battery shown in FIG. 1 was obtained. In FIG. 1, the can and the lid are omitted. The size of the secondary battery of Example 1 was 10 cm wide, 19 cm long, and 1 cm thick, and the battery capacity was 4 Ah.

Example 2

A secondary battery was obtained in a similar manner to Example 1 except that a separator having extremely high heat resistance (hereinafter, described as a high heat resistant article) was used to clarify the temperature relation between the separator and the resin of the porous member forming the collector.

Here, a secondary battery was fabricated in a similar manner to Example 1 except that a high heat resistant separator mainly composed of an aramid component was used.

The high heat resistant separator is BLC1420A available from Japan Vilene Company, Ltd. This separator has a highly thermostable shape characteristic as is evidenced from a deformation percentage of thermal contraction coefficient of 1% or less even at an elevated temperature of 230° C.

The size of the secondary battery in Example 2 was 10 cm wide, 19 cm long and 1 cm thick, and the battery capacity was 4 Ah.

Example 3

Using the same materials as those in Example 1, 13 negative electrodes and 12 positive electrodes were stacked to obtain a secondary battery of 18 Ah. The size of the secondary battery of Example 3 was 10 cm wide, 19 cm long and 4 cm thick.

Example 4

Using the same materials as those in Example 2, 13 negative electrodes and 12 positive electrodes were stacked to obtain a secondary battery of 18 Ah. The size of the secondary battery of Example 4 was 10 cm wide, 19 cm long and 4 cm thick.

Example 5

A secondary battery of 18 Ah was obtained using the same materials as those in Example 4 except that the collector of the negative electrode was implemented by a copper foil of 12 μm thick. The size of the secondary battery of Example 5 was 10 cm wide, 19 cm long and 4 cm thick.

Comparative Example 1

A negative electrode and a positive electrode were obtained in a similar manner to Example 1 except that an aluminum foil of 20 μm thick was used as a collector of the positive electrode, a copper foil of 12 μm thick was used as a collector of the negative electrode, and an ordinary article formed of polyolefin resin was used as the separator (likewise Example 1). 13 negative electrodes and 12 positive electrodes thus obtained were stacked to obtain a secondary battery of 18 Ah. The size of the secondary battery of Comparative example 1 was 10 cm wide, 19 cm long and 4 cm thick.

Comparative Example 2

A secondary battery of 18 Ah was obtained using the same materials as those in Comparative example 1 except that a high heat resistant article (likewise Example 2) was used as the separator. The size of the secondary battery of Comparative example 2 was 10 cm wide, 19 cm long and 4 cm thick.

Safety Evaluation

For the secondary batteries obtained in the manner as described above, a safety test was conducted in the following procedure.

For the secondary batteries having a capacity of 4 Ah of Examples 1 and 2, charging was conducted to a battery voltage of 3.6 V at a constant current of 400 mA (corresponding to 0.1 C). Then charging was conducted at a low voltage of 3.6 V for 3 hours. Then constant current discharging was conducted at 800 mA (corresponding to 0.2 C) to 2.25 V, and whether excellent charge and discharge characteristics as a secondary battery was obtained was examined. Thereafter, charging was conducted again to 3.6 V and a nail penetration test was conducted.

For the secondary batteries having a capacity of 18 Ah of Examples 3 to 5 and Comparative examples 1 and 2, charging was conducted to a battery voltage of 3.6 V at a constant current of 1800 mA (corresponding to 0.1 C). Then charging was conducted at a low voltage of 3.6 V for 3 hours. Then constant current discharging was conducted at 3600 mA (corresponding to 0.2 C) to 2.25 V, and whether excellent charge and discharge characteristics as a secondary battery was obtained was examined. Thereafter, charging was conducted again to 3.6 V and a nail penetration test was conducted.

In the nail penetration test, a nail having a nail diameter φ of 3 mm was penetrated into a secondary battery at a nail penetration speed of 1 mm/s, and a battery surface temperature at this time (the position 5 mm distanced from the part where the nail was penetrated) was measured.

TABLE 1

| | structure of positive electrode | structure of negative electrode | separator | capacity (Ah) | maximum surface temperature |
|---|---|---|---|---|---|
| Ex. 1 | non-woven fabric | non-woven fabric | ordinary article | 4 | 62° C. |
| Ex. 2 | non-woven fabric | non-woven fabric | high heat resistant article | 4 | 58° C. |
| Ex. 3 | non-woven fabric | non-woven fabric | ordinary article | 18 | 90° C. |
| Ex. 4 | non-woven fabric | non-woven fabric | high heat resistant article | 18 | 70° C. |
| Ex. 5 | non-woven fabric | Cu metal foil | high heat resistant article | 18 | 67° C. |
| Com. Ex. 1 | Al metal foil | Cu metal foil | ordinary article | 18 | 115° C. |
| Com. Ex. 2 | Al metal foil | Cu metal foil | high heat resistant article | 18 | ignition (unmeasurable) |

Both of the secondary batteries having a capacity of 4 Ah of Examples 1 and 2 experienced temperature rise but exhibited little difference in surface temperature, and hence had excellent safety.

As to the secondary batteries having a capacity of 18 Ah of Examples 3 and 4, it was confirmed that the surface temperature was higher for Example 3 using an ordinary article as a separator. It is considered that this is attributable to the fact that the heat generating behavior is rapid when the capacity is large, and a part of the separator which is the ordinary article melts and the pore expands, and the positive electrode and the negative electrode instantaneously come into direct contact with each other. In the secondary battery of Example 3, it was confirmed that the current was interrupted and the temperature decreased due to melting of the collector near the heat generation part.

On the other hand, in Example 4, since a high heat resistant separator is used, the pore will not expand by melting of the separator, and the positive electrode and the negative electrode will not come into direct contact with each other. Accordingly, it was confirmed that there is little difference in surface temperature with Examples 1 and 2 even though the capacity is larger. This reveals that when a collector formed of a non-woven fabric is used in a secondary battery having a large capacity, a separator having high heat resistance is desirably used.

In Example 5, a similar effect can be obtained even when a collector formed of a non-woven fabric is employed only in the positive electrode.

In Comparative examples 1 and 2, it is revealed that the surface temperature extremely rises when a separator of an ordinary article is used, but the temperature decreases without leading to ignition. It is also revealed that when a separator of a high heat resistant article is used, ignition will be caused because no measure for securing the safety is made.

From the foregoing, by using a collector formed of a plurality of resin fibers covered with a metal film, it is possible to improve the safety. Furthermore, for responding to an increased capacity, a secondary battery having higher safety can be obtained by using a separator of a high heat resistant article.

Example 6

As shown in FIG. 3, the secondary battery of Example 6 uses a collector formed of a plurality of resin fibers covered with a metal film in both of the positive electrode and the negative electrode.

The collector was obtained from OX-7617(T-3)282 which is a non-woven fabric available from Japan Vilene Company, Ltd. As shown in FIG. 3, in the collector of the positive electrode, the resin fiber 4a1 is a polyolefin resin fiber, and the metal layer includes the underlaying metal layer 4a21 composed by a nickel layer formed by a plating method, and the upper metal layer 4a22 composed by a gold layer. The use amount of the resin fiber 4a1 per area of the collector is 85 g/m$^2$, the use amount of the nickel layer per area of the collector is 215 g/m$^2$, and the use amount of the gold layer per area of the collector is 96 g/m$^2$. The collector of the negative electrode is equivalent to the collector of the positive electrode excluding the upper metal layer. The collector has a thickness of 1.1 mm, a tensile strength of 260 N/5 cm, a porosity of 92%, a surface resistance of 11 mΩ, a thermal deformation temperature of 120 to 180° C., and an endothermic peak at 130° C.

A lithium ion secondary battery shown in FIG. 3 was obtained in a similar manner to Example 1 except that the aforementioned collector was used, and 13 negative electrodes and 12 positive electrodes that are sealed by separator were stacked. The uncoated regions were arranged alternately. In FIG. 3, the can is omitted. The size of the secondary battery of Example 6 was 10 cm wide, 19 cm long and 4 cm thick. By charging and discharging the obtained secondary battery (lower limit potential: 2.25 V, upper limit potential: 3.8 V, charge and discharge rate: 0.1 C), a capacity of 20.2 Ah was obtained.

Example 7

A secondary battery having a capacity of 20.0 Ah was obtained in a similar manner to Example 6 except that the collector having the same structure as that of the positive electrode was used also in the negative electrode.

Example 8

A secondary battery having a capacity of 20.0 Ah was obtained in a similar manner to Example 6 except that 106 g/m$^2$ of platinum was used as the upper metal layer of the positive electrode.

Example 9

A secondary battery having a capacity of 20.1 Ah was obtained in a similar manner to Example 7 except that 106 g/m$^2$ of platinum was used as the upper metal layer of the positive electrode and the negative electrode.

Example 10

A secondary battery was obtained in a similar manner to Example 6 except that a separator having extremely high heat resistance (hereinafter, described as a high heat resistant article) was used to clarify the temperature relation between the separator and the resin of the porous member forming the collector.

Here, a secondary battery was fabricated in a similar manner to Example 6 except that a high heat resistant separator mainly composed of an aramid component was used.

The high heat resistant separator is BLC1420A available from Japan Vilene Company, Ltd. This separator has a highly thermostable shape characteristic as is evidenced from a deformation percentage of thermal contraction coefficient of 1% or less even at an elevated temperature of 230° C.

The size of secondary battery in Example 10 was 10 cm wide, 19 cm long and 4 cm thick, and the battery capacity was 20.1 Ah.

Example 11

A secondary battery having a capacity of 20.1 Ah was obtained in a similar manner to Example 7 except that a high heat resistant article was used as the separator.

Comparative Example 3

A secondary battery having a capacity of 18.0 Ah was obtained in a similar manner to Example 6 except that a collector not having an upper metal layer was used in the positive electrode and the negative electrode.

Comparative Example 4

A secondary battery having a capacity of 20.0 Ah was obtained in a similar manner to Example 6 except that an aluminum foil of 20 μm thick was used as a collector of the positive electrode, and a copper foil of 12 μm thick was used as a collector of the negative electrode.

Comparative Example 5

A secondary battery having a capacity of 20.2 Ah was obtained in a similar manner to Example 7 except that an aluminum foil of 20 μm thick was used as a collector of the positive electrode, and a copper foil of 12 μm thick was used as a collector of the negative electrode.

Safety Evaluation

For the secondary batteries obtained in the manner as described above, a safety test was conducted in the following procedure.

Charging was conducted to a battery voltage of 3.8 V at a constant current of 2000 mA (corresponding to 0.1 C). Then charging was conducted at a low voltage of 3.8 V for 3 hours. Then constant current discharging was conducted at 4000 mA (corresponding to 0.2 C) to 2.25 V, and whether excellent charge and discharge characteristics as a secondary battery was obtained was examined, and then charging was conducted again to 3.8 V and a nail penetration test was conducted.

In the nail penetration test, a nail having a nail diameter φ of 3 mm was penetrated into a secondary battery at a nail penetration speed of 1 mm/s, and a battery surface temperature at this time (the position 5 mm distanced from the part where the nail was penetrated) was measured.

ary battery was around 90° C. This is attributed to the fact that a part of the separator of the ordinary article melts by Joule heat due to a short circuit of the positive electrode and the negative electrode at the time of nail penetration and the pore expands, and the positive electrode and the negative electrode instantaneously come into direct contact with each other. However, current interruption occurred later at the collector near the heat generation part, and the temperature could be decreased. In a high heat resistant separator, heat generation was suppressed because a pore will not expand by Joule heat, and the positive electrode and the negative electrode will not come into direct contact with each other.

In other words, when a collector containing a resin fiber is used, it is desired to use a high heat resistant separator.

Comparative examples 4 and 5 are results for the cases where an aluminum foil was used as a collector of the positive electrode and a copper foil was used as a collector of the negative electrode. In this case, there is no safety mechanism in the collector, and the surface temperature of the battery is higher in the safety test. However, when a separator of an ordinary article is used, the surface temperature rises extremely, but the temperature decreases without leading to ignition. On the other hand, when a separator of a high heat resistant article is used, ignition will be caused because no measure for safety is made.

From the foregoing, it is possible to increase the capacity of the secondary battery using a collector formed of a resin fiber formed with two metal layers. While the secondary battery of the present invention is advantageous in the safety, it is also confirmed that a secondary battery having higher safety is obtained by using a separator of a high heat resistant article.

TABLE 2

| | structure of positive electrode collector (metal layer type) | structure of negative electrode collector (metal layer type) | separator | upper limit potential(V) | capacity (Ah) | maximum surface temperature |
|---|---|---|---|---|---|---|
| Ex. 6 | porous (Au—Ni) | porous (Ni) | ordinary article | 3.8 | 20.2 | 94° C. |
| Ex. 7 | porous (Au—Ni) | porous (Au—Ni) | ordinary article | 3.8 | 20.0 | 94° C. |
| Ex. 8 | porous (Pt—Ni) | porous (Ni) | ordinary article | 3.8 | 20.0 | 92° C. |
| Ex. 9 | porous (Pt—Ni) | porous (Pt—Ni) | ordinary article | 3.8 | 20.1 | 95° C. |
| Ex. 10 | porous (Au—Ni) | porous (Ni) | high heat resistant article | 3.8 | 20.1 | 75° C. |
| Ex. 11 | porous (Au—Ni) | porous (Au—Ni) | high heat resistant article | 3.8 | 20.1 | 74° C. |
| Com. Ex. 3 | porous (Ni) | porous (Ni) | ordinary article | 3.6 | 18.0 | 90° C. |
| Com. Ex. 4 | Al metal foil | Cu metal foil | ordinary article | 3.8 | 20.0 | 114° C. |
| Com. Ex. 5 | Al metal foil | Cu metal foil | high heat resistant article | 3.8 | 20.2 | ignition |

Since the secondary battery provided with a collector of the positive electrode having an underlaying metal layer and an upper metal layer as in Example 6 is able to suppress elution of nickel forming the underlaying metal layer, the charging upper limit voltage can be set at 3.8 V, and a capacity of 20 Ah is achieved. On the other hand, in the secondary battery of Comparative example 3 not having an upper metal layer, it is necessary to set the upper limit voltage at 3.6 V for preventing elution of nickel, and obtained capacity is only 18 Ah. An effect similar to that of Example 6 was obtained when the collectors having an upper metal layer was used in both the positive electrode and the negative electrode as shown in Example 7. A similar effect was obtained when a platinum layer was used in place of the gold layer as the upper metal layer as in Examples 8 and 9.

From the result of the safety evaluation test, it was confirmed that in Examples 10 and 11 using a high heat resistant separator, the maximum surface temperature of the secondary battery was around 70° C. On the other hand, in Examples 6 and 7 having a separator of an ordinary article, it was confirmed that the maximum surface temperature of the second- In the present examples, a high heat resistant separator was used to clarify the tendency, it suffices that the separator has a thermal deformation temperature higher than that of the resin member.

It is to be noted that the embodiments and examples disclosed herein are illustrative rather than limitative in all respects. The scope of the present invention is defined by claims rather than by the above description, and every modification within the meaning and range of equivalents of claims is intended to be involved in the present invention.

DESCRIPTION OF REFERENCE SIGNS

1 positive electrode, 1a collector, 1b positive electrode active substance material, 1c uncoated region on positive electrode, 2 negative electrode, 2a collector, 2b negative electrode active substance material, 2c uncoated region on negative electrode, 3 separator, 3a collector, 3a1 resin fiber, 3a2 metal film, 3b active substance material, 4a collector, 4a 1 resin fiber, 4a2 metal film, 4b active substance material, 4a21 underlaying metal layer, 4a22 upper metal layer

The invention claimed is:

1. A non-aqueous electrolyte secondary battery comprising electrodes including a positive electrode and a negative electrode, a separator positioned between the electrodes, and a non-aqueous electrolyte, wherein the electrodes have a collector carrying an active substance material, and the collector of at least one of the positive electrode and the negative electrode is a three-dimensional structure formed of a resin fiber covered with a metal film;
   wherein the resin fiber is a polyolefin resin fiber having at least one endothermic peak between 120° C. and 180° C. and a thermal deformation temperature of the separator is higher than that of the resin fabric.

2. The non-aqueous electrolyte secondary battery according to claim 1, wherein a nonwoven fabric formed of the resin fiber covered with the metal film forms the three-dimensional structure.

3. The non-aqueous electrolyte secondary battery according to claim 1, wherein the resin fiber is a resin fiber having a thermal deformation temperature of 200° C. or less.

4. The non-aqueous electrolyte secondary battery according to claim 1, wherein the resin fiber is covered with the metal film formed by a metal plating method or vapor deposition method.

5. The non-aqueous electrolyte secondary battery according to claim 2, wherein the polyolefin resin fiber includes a polyethylene resin fiber or a polypropylene resin fiber.

6. The non-aqueous electrolyte secondary battery according to claim 1, wherein the collector has a porosity of 50 to 98%.

7. The non-aqueous electrolyte secondary battery according to claim 1, wherein the metal film is a film of metal selected from nickel, aluminum, titanium and gold.

8. The non-aqueous electrolyte secondary battery according to claim 1, wherein the metal film covers the resin fiber in an amount of 50 to 300 g/m2.

9. The non-aqueous electrolyte secondary battery according to claim 1, wherein the non-aqueous electrolyte secondary battery has a capacity of 4 Ah or more.

10. The non-aqueous electrolyte secondary battery according to claim 1, wherein the non-aqueous electrolyte secondary battery has a capacity of 90 Ah/m2 or more per area of the positive electrode or the negative electrode.

11. The non-aqueous electrolyte secondary battery according to claim 1, wherein the collector carrying the active substance material has a resistivity of 10 Ω·cm or less.

12. The non-aqueous electrolyte secondary battery according to claim 1, wherein the collector of the positive electrode has the three-dimensional structure formed of the resin fiber covered with the metal film, and the metal film has an underlaying metal layer covering the resin fiber and an upper metal layer covering the underlaying metal layer.

13. The non-aqueous electrolyte secondary battery according to claim 12, wherein the underlaying metal layer is a layer of metal selected from nickel, copper, palladium, tin and alloys of these metals.

14. The non-aqueous electrolyte secondary battery according to claim 12, wherein the upper metal layer is a layer of metal selected from aluminum, titanium, gold and platinum.

15. The non-aqueous electrolyte secondary battery according to claim 12, wherein the collector of the positive electrode contains the underlaying metal layer of an amount of 50 to 300 g/m2 and the upper metal layer of an amount of 5 to 200 g/m2.

16. The non-aqueous electrolyte secondary battery according to claim 12, wherein the underlaying metal layer is used in an amount of 1.5 to 25 parts by weight, with respect to 1 part by weight of the upper metal layer.

17. The non-aqueous electrolyte secondary battery according to claim 1, wherein the non-aqueous electrolyte secondary battery has a potential of vsLi/Li+ of 3.3 to 4.5 V.

* * * * *